(12) United States Patent
Squire et al.

(10) Patent No.: US 11,030,915 B1
(45) Date of Patent: Jun. 8, 2021

(54) METHOD AND APPARATUS FOR PREPARING INTEGRATED MULTIPLE SKILL LEVEL READING MATERIALS

(71) Applicants: Shannon Leigh Squire, Canonsburg, PA (US); Sommer Ann Dongilli, Canonsburg, PA (US)

(72) Inventors: Shannon Leigh Squire, Canonsburg, PA (US); Sommer Ann Dongilli, Canonsburg, PA (US)

( * ) Notice: Subject to any disclaimer, the term of this patent is extended or adjusted under 35 U.S.C. 154(b) by 52 days.

(21) Appl. No.: 16/578,778

(22) Filed: Sep. 23, 2019

Related U.S. Application Data

(63) Continuation-in-part of application No. 16/225,310, filed on Dec. 19, 2018, now abandoned.

(60) Provisional application No. 62/607,961, filed on Dec. 20, 2017.

(51) Int. Cl.
*G09B 17/00* (2006.01)
*B42D 1/00* (2006.01)

(52) U.S. Cl.
CPC .............. *G09B 17/00* (2013.01); *B42D 1/009* (2013.01)

(58) Field of Classification Search
USPC ...................... 281/3.1, 15.1, 16, 22
See application file for complete search history.

(56) References Cited

U.S. PATENT DOCUMENTS

2010/0105016 A1* 4/2010 Margolis ................ G09B 17/00
434/178

* cited by examiner

*Primary Examiner* — Justin V Lewis
(74) *Attorney, Agent, or Firm* — Karen Tang-Wai Sutton

(57) ABSTRACT

A method of providing multiple reading skill level texts integrated into a same story. Each of the multiple reading skill level texts is assigned a unique visual identification of at least one of a different color, varying relative text size, varying relative typeface, capitalization, and bolded text. Each of the multiple reading skill level texts is an adapted version of the same story, with all reading skill levels arranged in a same paragraph of the same story, allowing a single book to be used with children whose ages range from infant to upper elementary school age and still maintaining age and skill appropriate content in the single book.

6 Claims, 7 Drawing Sheets

Drawings

BLACK = Infants
Red =Toddlers/Preschoolers/Grade-schoolers
Blue/entire page=Grade-schoolers Only read the large black words to your baby and toddler. Located that word in the artwork.

Only read the red sentences to your child. If a black word is included in the sentence, read that word also.

When your child is ready to hear or read the blue section, the entire page is read. That includes all red words, black words, and blue words.

Fig. 2

METHOD AND APPARATUS FOR PREPARING INTEGRATED MULTIPLE SKILL LEVEL READING MATERIALS

CROSS-REFERENCE TO RELATED APPLICATIONS

Reference is made to and priority claimed from U.S. application Ser. No. 16/225,310 filed Dec. 19, 2018, which itself claims priority to U.S. provisional application No. 62/607,961 filed Dec. 20, 2017.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISC OR AS A TEXT FILE VIA THE EFS WEB SYSTEM

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

The present invention relates to the field of education and demonstration. Specifically, the present invention is a method of preparing reading material having multiple reading skill level texts integrated within a single cohesive storyline and within a same book apparatus allowing the same book apparatus to teach reading skills to children of varying reading skill levels using a systematic adaptation of the storyline through use of integrated but visually differentiated reading skill level texts.

(2) Description of Related Art

Children's books function to both entertain and develop reading skills, and given that every child starts as a non-reading child that rapidly acquires progressively increasing reading skills, a book having an appropriate reading skill level today equally rapidly becomes obsolete as the child's reading skill level moves beyond that of the once-appropriate book. In particular, reading skill levels change rapidly between birth and upper elementary aged children, and thus preparing a single children's book capable of accommodating reading skill levels ranging from non-reading infants and toddlers, who learn early reading skills by associating words with simple illustrations, to early readers who rely on illustrations coupled with simple text sentence forming stories, and all the way to more advanced elementary school aged readers whose reliance on illustrations as visual cues decline while reliance on contextual clues within the written text increase, has all been impossible and impractical. Instead, story content for children's books is prepared according to a narrow range of reading skill levels typically by identifying age appropriate content corresponding roughly to reading skill level typical for developmental age. This method of preparing children's books is lucrative for the publishing industry, as many books are required in a relatively short period of the child's life. Parents and educators who must purchase and maintain a large inventory of books covering many reading skill levels are less happy, as many books are outgrown in often less than two years.

One significant problem with the current method of preparing children's books is that the reading child and his or parent, older child or other reader, often form an emotional attachment to a favorite book, and are thus reluctant to part with it. All are torn between the emotional attachment to the book and the need for increased intellectual stimulation and challenge. Meanwhile, the current method of preparing children's books forces the parent or the reader into a Sisyphean choice of acquiring many books or self-adapting inappropriate reading skill level books. Often, the choice that prevails is choosing a book whose reading level is too advanced for the reading child or listening child and making ad hoc self-adaptations to make the content appropriate for the reading child or listening child. The result is often unsatisfactory: inappropriate content or reading level material makes a listening child restless and quickly frustrates a reading child. The ad hoc nature of self-adaptation changes the story and is impossible to implement with a new unfamiliar story, and removes the repeatability of specific text, a known method effective for progressively teaching and acquiring reading skills.

What is needed is a method of preparing multiple reading skill levels integrated into a single cohesive story and creating a single book using the method capable of accommodating early readers from ages of infant to upper elementary grade school age, and where the multiple reading skill level texts are systematically assigned visual information so as to allow easy identification of appropriate reading skill level texts and thus systematic adaptation of the story that retains storyline and adaptation repeatability.

BRIEF SUMMARY OF THE INVENTION

In a first aspect, a method for providing multiple reading skill level texts integrated into a same paragraph in a same story so as to create a cohesive story for children based on at least one of age and reading skill level is provided. Each of the multiple reading skill level texts are assigned at least one of a color, text size, capitalization, and typeface to allow visual differentiation of the multiple reading skill level texts relative to one another.

In a second aspect, a book created by the method features a plurality of pages, of which at least a first page is an instructional page with a key denoting each reading skill level and its assigned visually identifying text is provided. A second page is a storyline page having artwork in which some component of the artwork corresponds to a first reading level text of the paragraph on the second page, and in which the artwork on the second page complements and emphasizes the storyline told by the entire paragraph. The cohesive story thus comprises a plurality of storyline pages, each with artwork and a paragraph having multiple reading skill level texts integrated into the paragraph on a same page.

BRIEF DESCRIPTION OF DRAWINGS

FIG. 2 is a diagrammatic representation of a first page of a multiple reading skill level book providing a method for reading the book, with a reading skill level key or legend showing each of three reading skill levels texts as represented by three different colors.

DRAWINGS LIST OF REFERENCE NUMERALS

Figure 1:
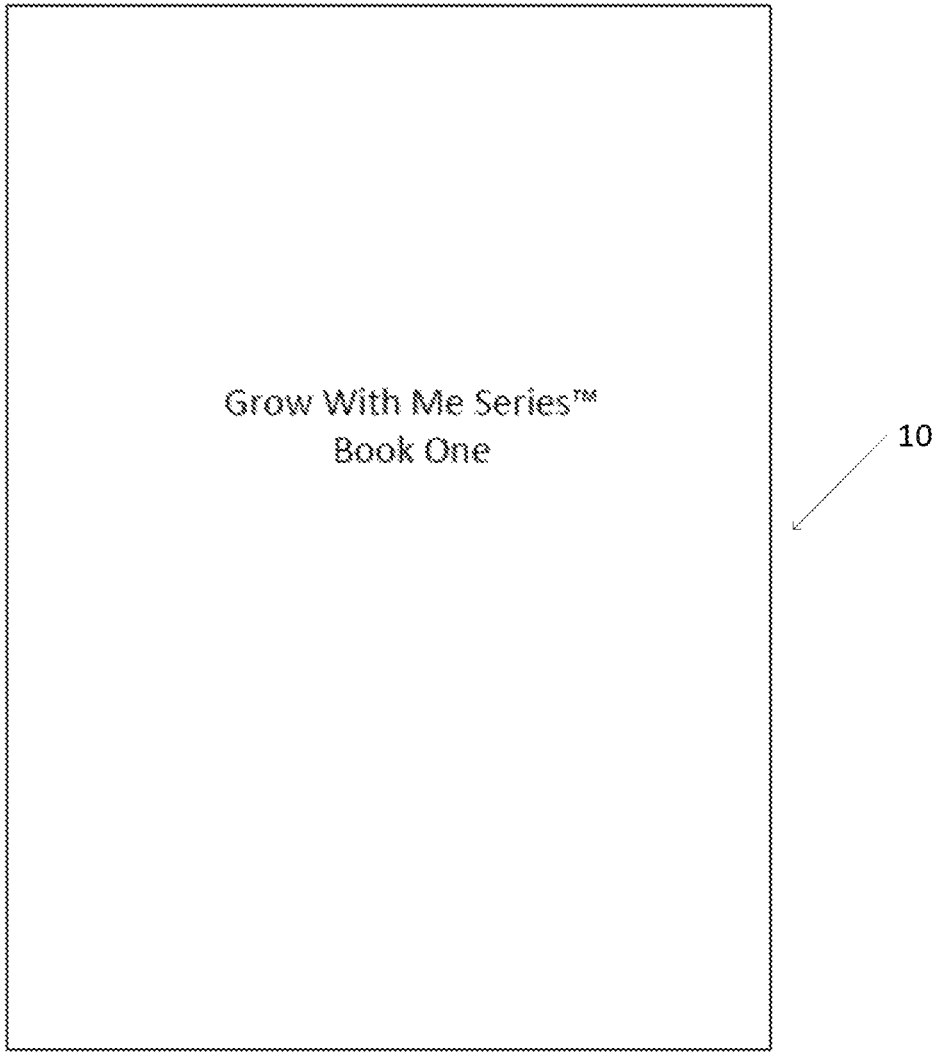
FIG. 1 is front view of a multiple reading skill level book according to the invention.

The following is a list of reference labels used in the drawings to label components of different embodiments of the invention, and the names of the indicated components.
10 multiple reading skill level book
12 filter
12a cord
14 introductory reading method page or first page
16 illustration
18 story page or second page
20 first reading skill level text
22 legend or key
30 second reading skill level text
40 third reading skill level text
50 method of writing multiple reading skill level texts
50a-g steps for method of writing multiple reading skill level texts and creation of a book
60 paragraph

DETAILED DESCRIPTION OF THE INVENTION

A method of preparing multiple reading skill level texts 50, and a multiple reading skill level book 10 using the method are described in FIGS. 1-6.

Figure 3A:
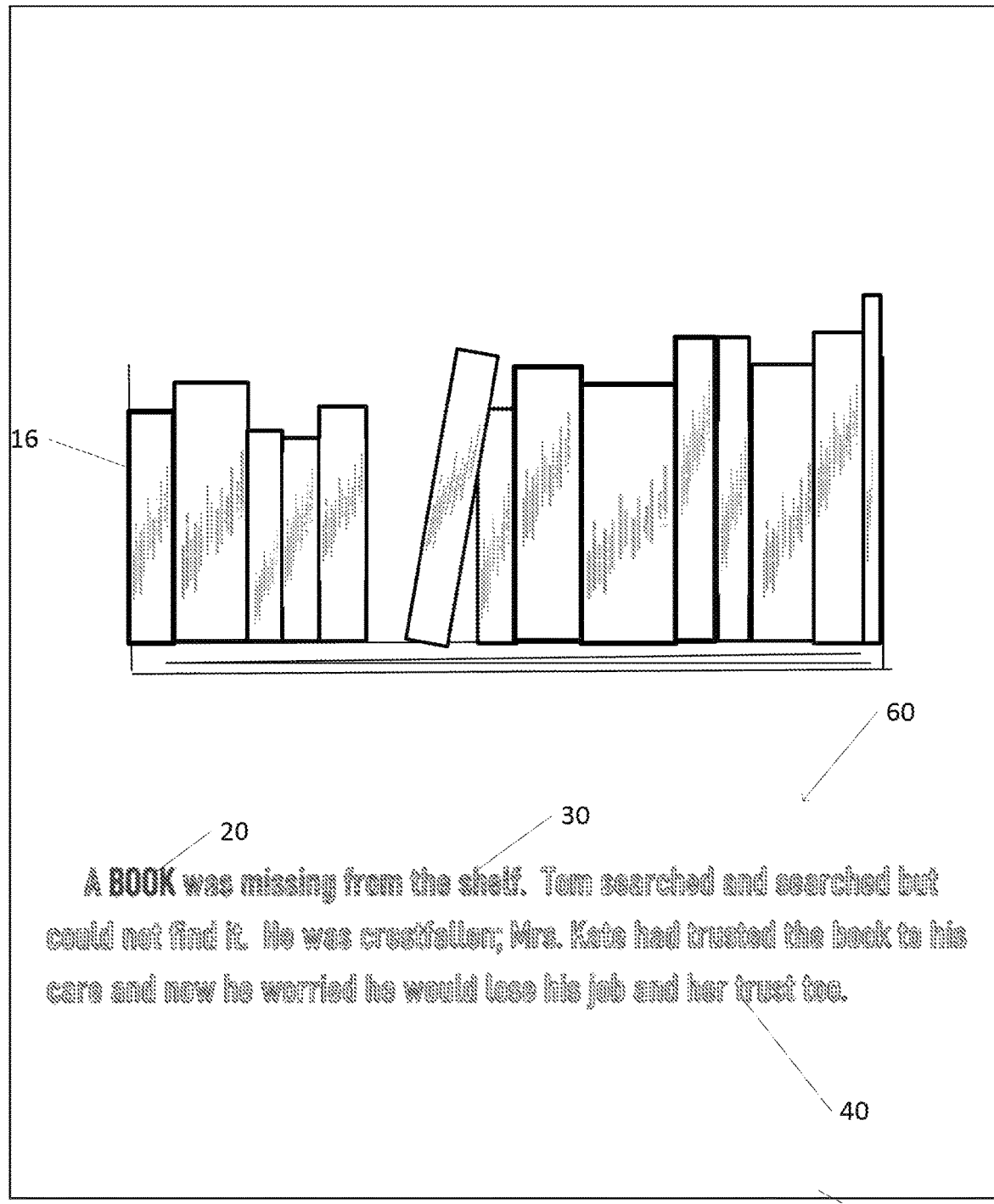
FIG. 3a is a diagrammatic representation of a second page of the multiple reading skill level book introducing a specific story of the book, representative of a page of the book following the first page.
Figure 3B:
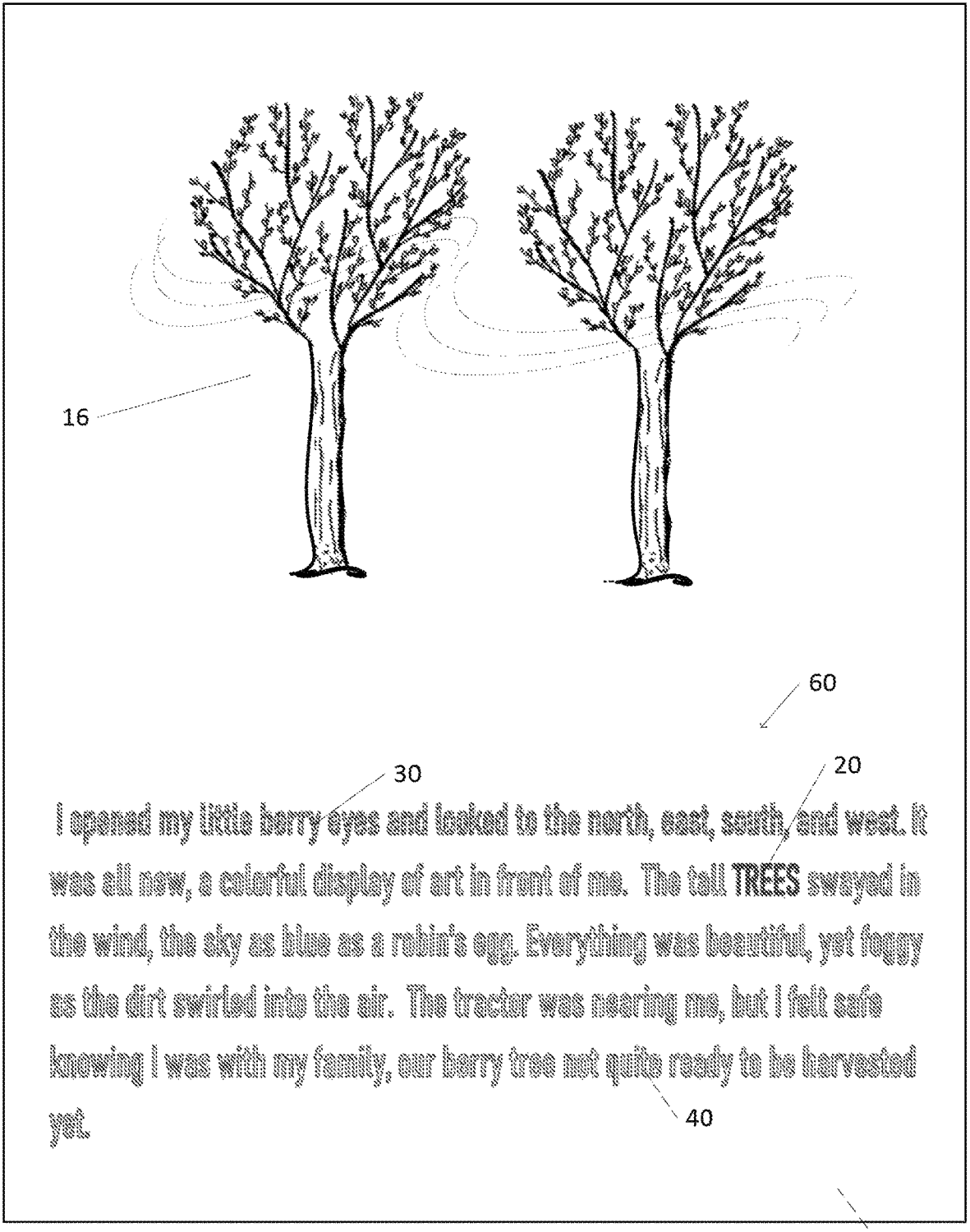
FIG. 3b is a diagrammatic representation of a third page of the multiple reading skill level book in a middle of the story of the book, representative of another page of the book following the first and second pages.
Figure 4:
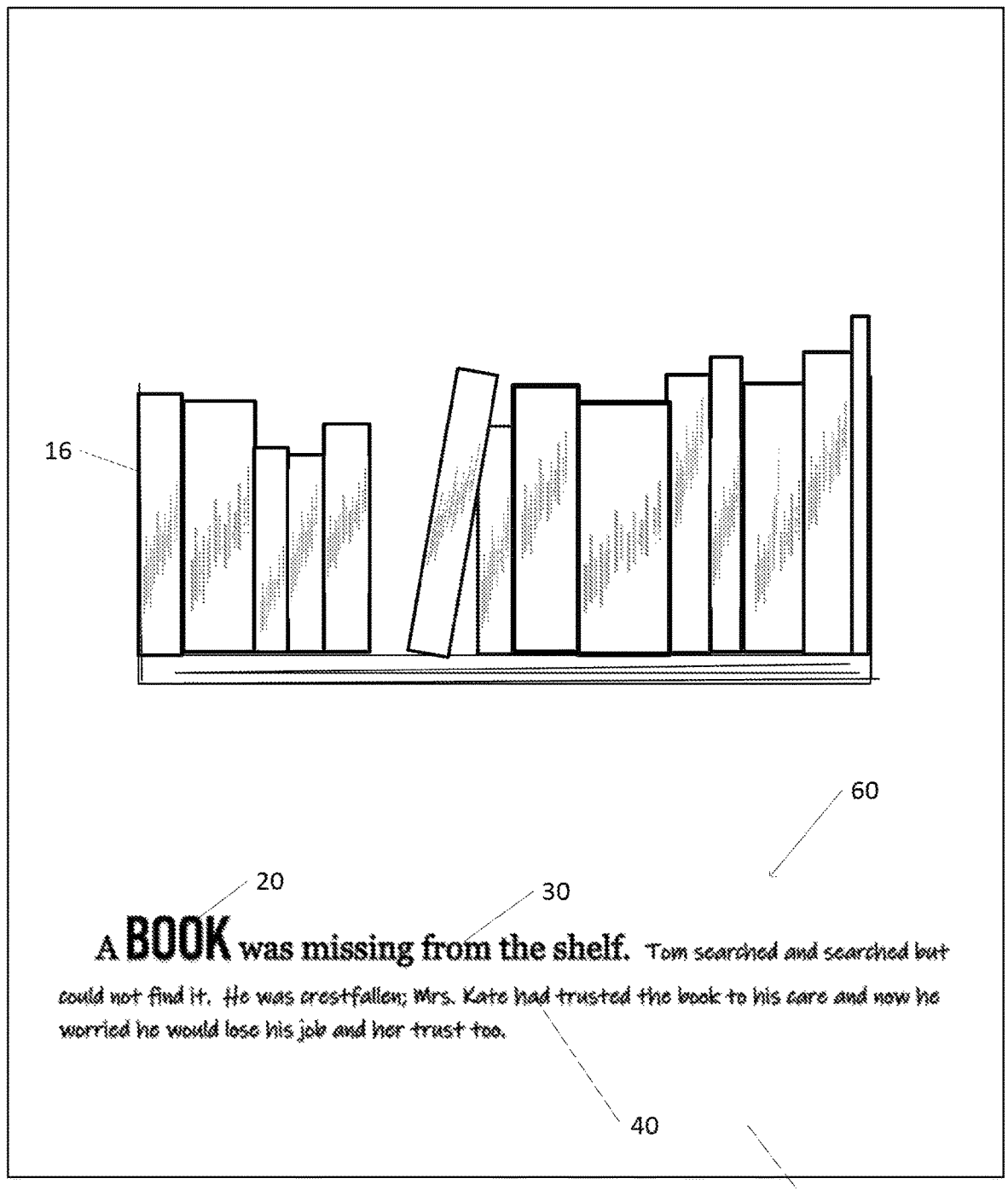
FIG. 4 is a diagrammatic representation of the second page of the tiered reading skill level book where each different skill level text is represented by a relatively different sized text when visually compared to all texts on the second page.

Turning now to FIGS. 1-4, the multiple reading skill level book 10 has at least two pages 14 18 in a fixed page order, each page having a text portion arranged as at least one paragraph 60 and an artwork portion comprising at least one diagram or illustration 16. An introductory reading method page or first page 14 of the book 10 describes a method of reading the book 10 and includes a legend or key 22 used to identify each reading skill level 20 30 40 found on a story page or second page 18 and on each subsequent page of the book 10. The key 22 provides a visual code in which the reading skill level texts 20 30 40 are differentiated by at least one of color, text size, bolded text, capitalization, and typeface. It should be noted that "second page" here means any page in the book after the first page, and could in fact be a third, tenth, twentieth, or other page. FIG. 2 provides an example of the first page and FIGS. 3a-b provide examples of the second page of the book 10. In these examples, a first reading skill level text 20 is identified as black colored, bolded text that is also capitalized, a second reading skill level text is identified as red colored text, and a third reading skill level text is identified as blue colored text and/or the entire page of texts; that is, the third reading skill level texts are specifically just the blue colored texts, but if the third reading skill level texts are an appropriate reading skill level, each paragraph 60 having all skill level texts is read by a reading child or by a reader reading to a listening child and represents an uppermost reading skill level text. In FIG. 4, the first reading skill level text is capitalized and bolded text that is also relatively larger in size compared to the text of the second and third reading skill level texts, and each of the first, second and third reading skill level texts features a visually distinct typeface. The artwork shown in FIGS. 3a and 3b relate to the entire paragraph 60 on the page, and a component of the artwork specifically is described by the first skill level text. For instance, in FIG. 3a, the illustration is of a bookshelf, showing multiple books on the shelf and an available space for one book. The first skill level text is comprised of the word BOOK. Hence, the artwork on each page enhances and emphasizes the texts in the paragraph and is not strictly just artwork relating to one reading skill level text, nor is artwork on the page divvied up according to reading skill level texts. The artwork portion of the page thus has a single illustration relating to the entirety of the paragraph, and not just to one of the reading skill level texts.

As children of a same age can vary widely in reading ability, the key 22 provides age and skill level guide suggestions only, and the reader, who is an adult or older child reading to the listening child, or the reading child him or herself, starts with the suggest skill level text in the key 22 and then chooses to read one or more skill levels of text as appropriately determined by the reader or the reading child. The first page 14 is a same page in every book 10 and instructions on the first page 14 as shown in FIG. 2 provide the method of reading to unfamiliar readers. It should be noted that the specific key 22 shown in FIG. 2 is adapted according to a predetermined assignment of visual differentiation to each reading skill level. For instance, if using color to visually differentiate the reading skill levels, any three colors can be used to denote the different reading skill levels, not just black, red, and blue, however, once selected and identified in the key 22, the colors so designated are consistent throughout a same book 10. The inventors note that as a practical matter, a book series will retain a same key 22 throughout the series. Use of non-color visual assignments, such as typeface and relative text size is useful when materials are provided in black and white or otherwise cannot be produced using color, such as would be the case for less expensive books, or for readers and reading children with varying degrees of color-blindness or other visual deficits that make color assignments to the different reading skill level texts less appealing and practical.

A first reading skill level text 20 is assigned by either an age of the reading child or listening child, or alternatively by reading skill ability of the reading child or listening child. In FIGS. 2 and 3a-b, for instance, the first reading skill level 20 is shown in bolded black text that is also shown capitalized, and corresponds with an infant and toddler reading skill level. According to age, a reader with a listening child of infant age would read the black bolded text. If the listening child is infant or toddler age, both the black and red texts are read by the reader to the listening child. In terms of reading skill ability, the first reading skill level 20 is for a non-reading child who either cannot identify words or letters, or who has minimal recognition ability of words or letters, and a reader, usually an adult or older sibling or child, will read the first skill level texts to the listening or reading child, who will typically be an infant or a toddler.

A second reading skill level text 30 in FIGS. 2 and 3*a-b* is assigned by age to toddler, preschooler, and grade school age children, and the second reading skill level corresponds with early reading skills roughly up to about grade 2. According to the key 22 in FIG. 2, the second reading skill level text is shown in a red colored text, and both the first and second skill level reading text is read to the listening child or by the reading child.

A third reading skill level text 40 in FIGS. 2 and 3*a-b* is assigned by age and reading skill level to grade schoolers, which covers children ages 6 to 12 and corresponds with grades 1 to 6 of elementary school. According to the key 22 and the instructional first page 14, the reading child or listening child who can read the third reading skill level text 40 is to read or have the reader read all three skill level texts on each page of the book 10. In FIGS. 2 and 3*a-b*, the third reading skill level text specifically is shown in blue colored text, with instructions that all texts colors are to be read.

FIG. 4 shows another embodiment of the second page 18, where instead of showing the first, second and third reading skill levels as different colored texts, the different reading skill level texts are assigned relatively varying sized texts, which may also vary in terms of typeface style and capitalization as shown specifically in FIG. 4. It should be noted however that a same typeface but with varying sized text could also be used to differentiate different reading skill level texts, and FIG. 4 is illustrative of a sample embodiment in which the invention can be practiced where the texts 20 30 40 are a same color but assigned a different visual identification.

Starting on the second page 18 and on each subsequent page, one the illustration 16 from the artwork for the story corresponding to one paragraph 60 of the story are positioned on a page, with the illustration 16 typically positioned above the paragraph 60. All artwork and paragraphs maintain a consistent relative position on the pages of the story. The illustration 16 on each page always has a component or portion of the illustration corresponding with the first reading skill level text 20 of the paragraph 60, but to be clear, the illustration on each page often describes more than the first reading skill level in the paragraph on that page. In FIGS. 3*a* and 4, for instance, the illustration 16 is a drawing of the bookshelf with multiple books and one space for another book, and the first reading skill level text is the word BOOK. In FIG. 3*b*, the illustration 16 is a pair of trees with lines representing blowing wind, and the first reading skill level text is the word TREES. It should be noted that the illustration on each page can be simple, as in the Figures, or complex, visually describing up to the entire storyline in the paragraph 60 on the page, and thus is not limited to a specific reading skill level text, nor is each reading skill level assigned a different illustration on the page.

Figure 5:
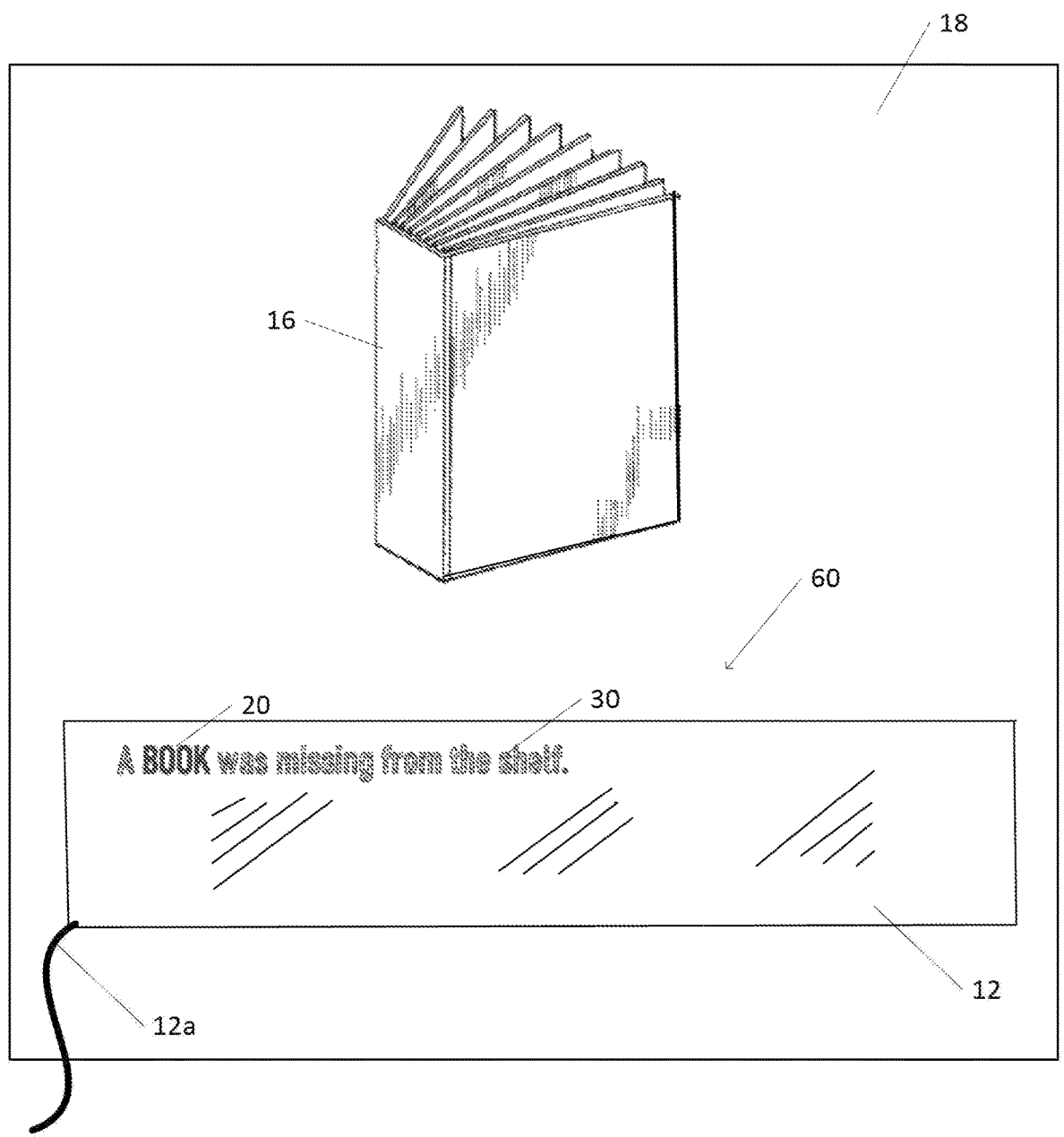
FIG. 5 is a diagrammatic representation of the second page of the multiple reading skill level book in FIG. 2, shown with a physical color filter positioned over a third skill level text portion of the second page.

FIG. 5 shows an additional physical filter 12 to be optionally used when the multiple reading skill level texts are assigned colors, and is in fact a colored filter placed over the paragraph 60 so as to visually isolate the first and second reading level texts and visually cover the third reading skill level text for a reading child who may be distracted by the additional third reading skill level texts within the paragraph 60. The filter 12 is typically a sheet of thin plastic and colored such that when placed over the paragraph 60, the filter cancels out the third reading skill level text and renders it visually indistinct to the reading child. The filter 12 would preferably be attached to the book 10 by a cord 12*a* so as to prevent loss, and can be additionally used as a bookmark, or it may be affixed to a lowermost portion of each page or to a book cover and moved over or away from the paragraph 60 as required.

Figure 6:
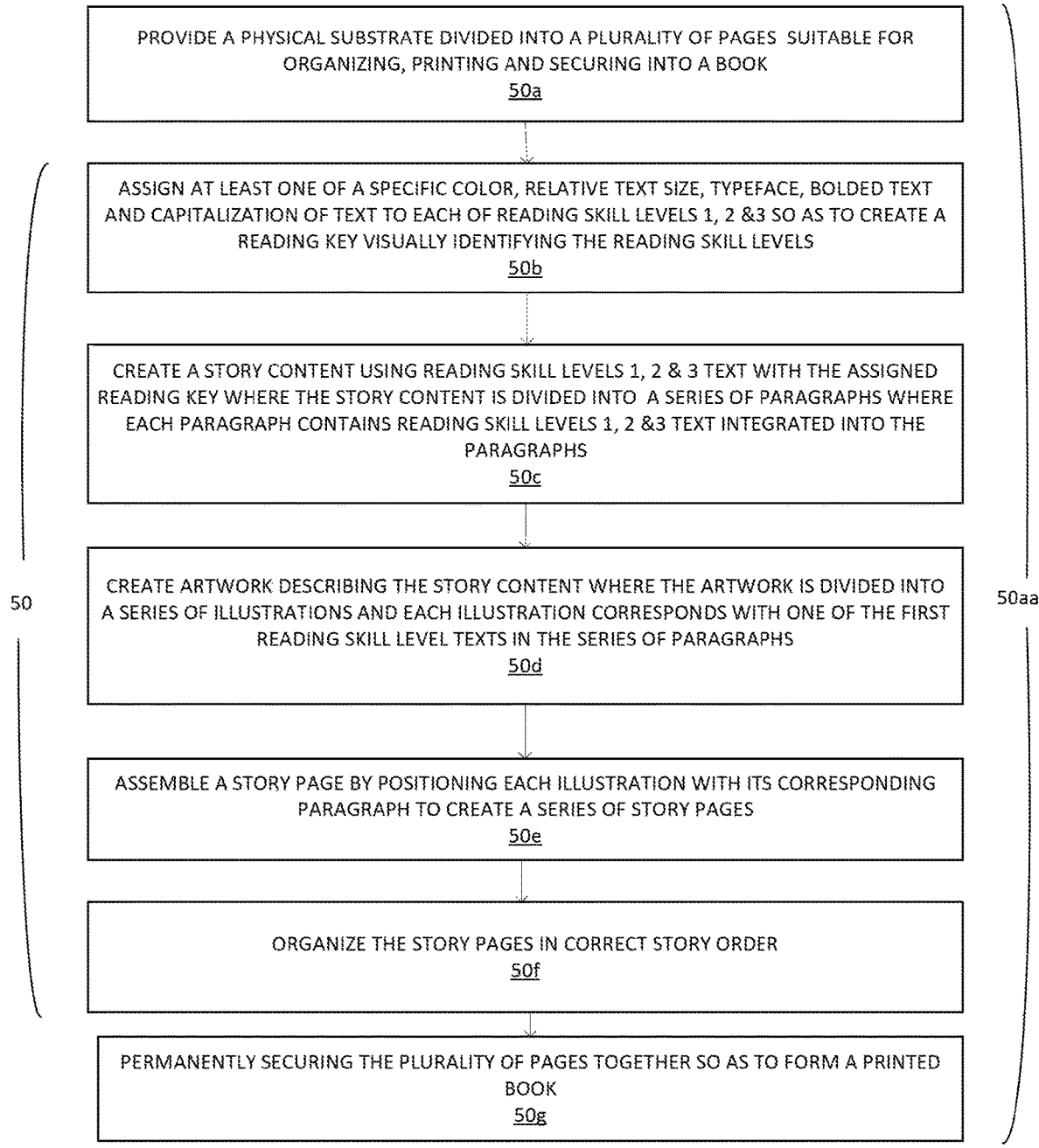
FIG. 6 is a diagrammatic representation of a method of providing a story using multiple reading skill level texts integrated together into a series of paragraphs and illustrations, and a book resulting from the method.

FIG. 6 shows the method 50 of providing multiple reading skill level material integrated within a same story, within a same paragraph of the same story using steps 50*b-e*, and the book 10 created using a method 50*aa* incorporating the method 50 of providing multiple reading skill level material with additional steps 50*a* and 50*g*.

The method 50 of providing multiple reading skill level material assigns each reading skill level a visual code, typically a color, relative text size, typeface, bolded text, and capitalization 50*b*. Story content is created relying on the reading skill level text assignments, with story content divided into a series of paragraphs 60, where each paragraph 60 contains all reading skill levels integrated into each paragraph 50*c* as shown in FIGS. 3*a-b* and FIG. 4. Artwork describing the story content is created and divided into a series of individual illustrations 16 where each illustration has at least one visual component corresponding with one of the first reading skill level texts in the series of paragraphs 50*d*, and ideally, each paragraph's corresponding illustration partially or fully describes the paragraph's storyline. A story page is assembled with each page having an illustration and corresponding paragraph 50*e*, resulting in a plurality of story pages. Next, the story pages are organized in a correct story order 50*f*, where the story content is now finally organized as a series of story pages, each page having an illustration and a paragraph, in a particular fixed order.

The method of creating a book 50*aa* uses the method 50 described herein plus two additional steps: providing a physical substrate divided into a plurality of pages suitable for organizing, printing and permanently securing into a book 10, which in FIG. 6 is shown as a first step 50*a* prior to the step of assigning 50*b*, and a final step of permanently securing the plurality of pages together so as to form a printed book 50*g* performed after the step of organizing 50*f*. The physical substrate is typically paper-based, although any other suitably thin paper-like or paper substitute such as plastic that can be printed with ink or laminated with the illustrations 16 and paragraphs 60 and then secured into a physical book with a fixed arrangement of the story pages can be used with the method 50*aa*.

The method 50 and the book 10 created by using the methods 50 50*aa* described herein provide many useful advantages over the current method of preparing reading skill level texts and the resulting books created by performing the method with a physical substrate. Instead of purchasing multiple books according to the reading child or listening child's current appropriate reading level, a single book according to the invention described herein replaces the plurality of books from the prior art. The different reading skill level texts are in fact adaptations of the same story, and hence, reading only the first second reading skill level texts 30 in the book 10, for instance, still results in a cohesive storyline, as does reading only the first reading skill level text 20 on one page, and reading a combination of the first and second reading skill level texts 20 30 on another page. Reading each additional reading skill level text adds content, depth and vocabulary that enhances rather than alters the story in a controlled, systematic way. The ad hoc method of skipping paragraphs or sentences that often changes the story and information necessary to understand the story as required by prior art books to forcibly adapt them to the reading child or listening child's appropriate reading skill level is no longer necessary with the invention described herein. The method 50 describes a systematic adaptation of reading skill level material that allows at multiple reading skill level texts to be integrated into a single story, which currently in the prior art is handled by creating multiple separate books in which each book is in fact prepared and an adaptation of the same story, but for a specific reading skill level. When the reading child or listening child's skill level increases, a new book is necessary. In contrast, the stories written using the method 50 and the books 10 resulting from the methods 50 50aa described herein allows a single book to span multiple reading skill levels easily and systematically.

Each reading skill level, whether differentiated by color, text size, capitalization, or typeface, is thus an adapted version of the same story, all located on one page with a corresponding illustration 16. Once the reading child or listening child progresses to a new reading skill level, the reading child or reader is free to revisit a previous level by reading the appropriate reading skill level texts independently. This coded reading system allows the reading child, typically at one reading skill level, to move to a higher or lower level, depending on need, without sacrificing age-appropriate content. Even siblings of different ages can enjoy the same book by reading the appropriate reading skill level texts for their developmental stage.

The methods 50 50aa and book 10 described herein provide enrichment and remedial opportunities for children of many ages and skill levels and facilitate teaching because needs of all reading children can be met with one book 10. Since each book created using the methods 50 50aa contains multiple story adaptations and a way to systematically read those adaptations, learning and teaching opportunities expand exponentially. The reading child can read one reading skill level text on one page, and then read a different reading skill level text on another page, allowing the reading child or reader with a listening child to systematically shorten or lengthen the story as needed. In addition, multiple readers can take turns reading, allowing a reading child to read at the appropriate level but listen to more advanced reading skill level texts. The book 10 created by practicing the methods 50 50aa described herein eliminates the prior art plurality of books now required to progressively teach reading skills to the non-reading child, all the way to the upper elementary grade school reading skilled level child, and that same child from infant age to upper elementary grade school age can use, learn, and enjoy the same book for many years.

It is to be understood that the above-described arrangements are only illustrative of the application of the principles of the present invention. Numerous modifications and alternative arrangements may be devised by those skilled in the art without departing from the scope of the present invention.

We claim:

1. A multiple reading skill level book, comprising:
a first page having a key identifying a first reading skill level text, a second reading skill level text, and a third reading skill level text, each of the first, second and third reading skill level texts respectively assigned to unique visual identifications; and
a second page having an illustration providing visual information and a written paragraph comprising texts whose reading skill level is the first reading skill level and at least one of the second and third reading skill levels;
wherein colors are used to identify the first, second and third reading skill level texts;
wherein the illustration and the written paragraph are both non-removably affixed to a same page; and
wherein the visual information of the illustration is described at least in part by the first reading skill level text of the written paragraph.

2. The multiple reading skill level book in claim 1, wherein the first reading skill level text is an infant reading level.

3. The multiple reading skill level book in claim 1, wherein the second reading skill level text is at least one of a toddler, preschooler and grade-schooler reading level.

4. The multiple reading skill level book in claim 1, wherein the third reading skill level text is grade-schooler reading level.

5. The multiple reading skill level book in claim 1, wherein the colors used to identify the first, second and third reading skill level texts are black, red and blue, respectively, and wherein each of the first, second and third reading skill level texts in the book use a same identifying color throughout the book.

6. The multiple reading skill level book in claim 1, wherein at least one of the first, second and third reading skill level texts is visually identified using at least one of bold and capitalized letters.

* * * * *